United States Patent [19]

Quintilian

[11] 4,350,880
[45] Sep. 21, 1982

[54] AUTOMATIC FUEL-COST MONITORING SYSTEM

[76] Inventor: Bartholomew F. Quintilian, 4259 Sheldon Ave., Baltimore, Md. 21206

[21] Appl. No.: 195,088

[22] Filed: Oct. 8, 1980

[51] Int. Cl.³ .............................................. G01C 22/00
[52] U.S. Cl. ............................................................ 235/96
[58] Field of Search ................ 235/61 J, 61 M, 95 R, 235/96, 97, 94 R, 30 R

[56] References Cited

U.S. PATENT DOCUMENTS

| | | | |
|---|---|---|---|
| 1,489,060 | 4/1924 | Brandenburg | 235/61 J X |
| 2,063,049 | 12/1936 | Parsons | 235/30 R X |
| 2,522,299 | 9/1950 | Redue | 235/61 J X |
| 2,593,628 | 4/1952 | Strong | 235/61 J |
| 2,767,912 | 10/1956 | Mennesson | 235/61 J |
| 3,188,647 | 6/1965 | Davis | 235/97 |
| 3,206,116 | 9/1965 | Short | 235/95 R X |
| 3,357,636 | 12/1967 | Ferro | 235/95 R |
| 3,703,985 | 11/1973 | Berg | 235/30 R |
| 3,735,103 | 5/1973 | Finley | 236/95 R |
| 4,112,492 | 9/1978 | Summera | 364/442 |
| 4,186,296 | 1/1980 | Crump | 235/61 J |
| 4,204,112 | 5/1980 | Lane | 235/95 R |

Primary Examiner—L. T. Hix
Assistant Examiner—Benjamin R. Fuller
Attorney, Agent, or Firm—John F. McClellan, Sr.

[57] ABSTRACT

A system for budgeting fuel costs and for emitting an unwarranted-cost alarm based on instantaneous consumption, in a motor vehicle using liquid, gaseous, solid (or with adaptation, electrical) fuel includes an input drive to a counting meter showing accumulation in monetary units of fuel costs, mechanism for compensating speed of counting meter based on engine efficiency and variables of estimated vehicle miles per unit of fuel and on cost of fuel per unit of measure; mechanism is provided for connecting to a vehicle odometer cable to provide input speed in direct relation to vehicle speed along with provision for splicing the odometer cable to the meter drive and to provide cable extension to odometer, provision for re-setting cost indicating meter back to zero and to lock all settings of meter speed selection and reset. Plural modes of use are disclosed.

20 Claims, 7 Drawing Figures

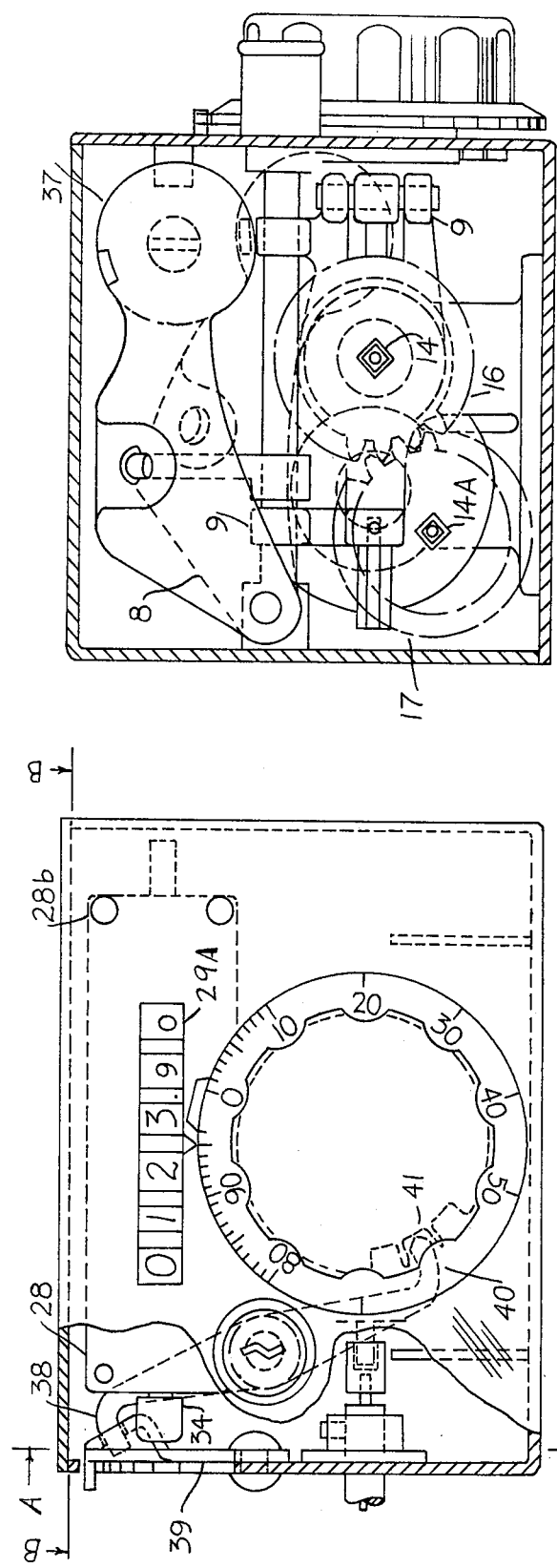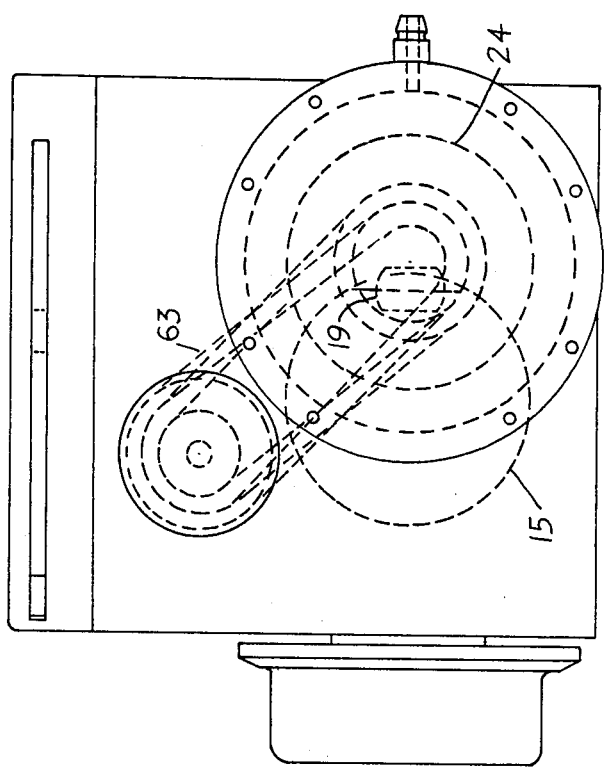

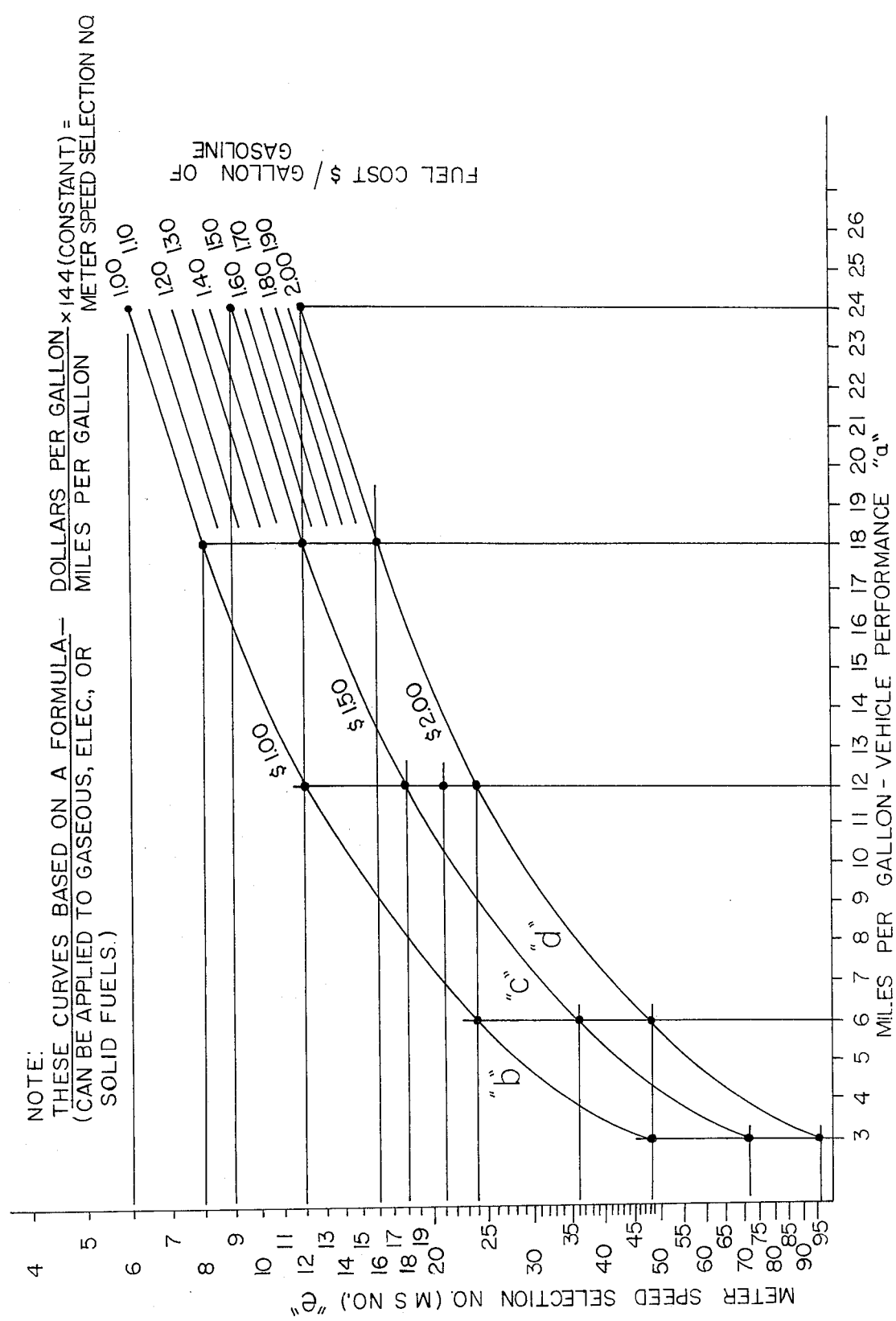
FIG. 5 COST INDEX CURVES

AUTOMATIC FUEL-COST MONITORING SYSTEM

Cross-reference is made to my co-pending U.S. patent application Ser. No. 098,346 filed Nov. 28, 1979, for Automatic Fuel Monitoring System.

BACKGROUND OF THE INVENTION

This invention relates generally to fuel/mileage cost budgeting and specifically to a system well adapted for use in reference to motor vehicles.

My co-pending application cites five U.S. patents.

In the prior art various other patent disclosures have been made including those in the following U.S. Pat. Nos.:

1,489,060 to D. C. Brandenburg, Apr. 1, 1924, discloses a vacuum-related fuel-consumption indicator for motor vehicles;

2,063,049 to J. B. Parsons, Dec. 8, 1936, discloses a taximeter, one of many patents on units reading time/distance in terms of money, with a vacuum hookup, which, however, serves another purpose than engine performance indication;

2,593,628 to H. G. Strong, Apr. 22, 1952, discloses an instrument in which a readout of miles per gallon results in part from a vacuum-bias-connection with an engine element;

2,522,299 to H. O. Redue, Jr., Sept. 12, 1950, discloses an intake-manifold connected miles per gallon gauge;

2,767,912 to A. L. Mennesson discloses another form of rate of fuel consumption readouts connected with engine vacuum;

3,357,636 to J. J. Ferro, Sr., Dec. 12, 1967, discloses an odometer with provision for setting the drive ratio by varying a roller on a friction unit;

3,703,985 to K. W. Berg, Nov. 28, 1978, discloses a taxi meter with variable speed/distance inputs affecting the fare readout, which itself is adjustable;

3,735,103 to C. E. Finley, May 22, 1973, discloses friction disk odometer setting in the automotive field;

4,112,492 to G. J. Summera, Sept. 2, 1978, discloses a fuel economy circuit response to a fuel flow-rate sensor to indicate consumption per unit distance;

4,186,296 to J. M. Crump, Jan. 29, 1980, discloses a unit with a running display of miles/gallon to encourage conservation;

4,204,112 to D. W. Dane, May 20, 1980, discloses a friction-output "can read in any arbitrary type of unit desired".

BRIEF SUMMARY OF THE INVENTION

This system is intended to impart a new sense of conservation as to method of driving and distance traveled, by announcing to drivers the running fuel cost of operating the engine of a motor vehicle.

This automatic fuel cost monitoring and alarm system is designed to provide operators of any power-driven vehicles with knowledge of the running costs of fuel consumed on a continuous basis. The total cost in monetary units is displayed on a counting meter calibrated on the basis of the cost per unit of fuel and miles traveled per unit of fuel. Alarm is provided for warning of unnecessary expense. The meter is driven by a cable take-off from the conventional cable that drives the regular odometer. Through use of the monitor it is expected that operators will be encouraged to practice fuel conservation during times of fuel shortage and high prices.

Monetary budget limits can best be dealt with when advance warnings are visibly displayed automatically and persistently. In this manner discretionary action can be taken in vehicle usage long before the limits are reached.

The design is based in part on the principle that given the proper speed ratio a counting meter calibrated in monetary units and driven by a take-off from the regular odometer cable will exhibit continuing accumulation of fuel costs. In order to compensate for changing fuel prices, the counter speed ratio in relation to the input speed must be increased or decreased as the prices go up or down. The same must be done to compensate for changing performance efficiency of the vehicle. To compensate effectively for the two variable factors which influence fuel costs, one of the Figures in this application shows the cost index curves that correlate the effect of the two variable factors on the meter speed selection number to which the speed dial disclosed is set. Clockwise turning of the dial slows down the meter and counterclockwise turning of the dial speeds up the meter with respect to the input speed. The relationship of the three factors as displayed by the curves is based on the formula cost per gallon ÷ miles per gallon = cost per mile. For examples: assume cost per gallon is $1.00 and miles per gallon (vehicle performance determined by test) is 12. Then $1.00 ÷ 12 = $0.083 cost per mile.

To provide a convenient number for the meter speed selection, arbitrarily 144 was selected as a multiplier for the ratio of dollars per mile.

For example: $1.00 ÷ 12 = $0.083 × 144 (constant) = 12 Speed selection No. Here the meter will display an increase of $0.083 for every mile.

In summary, the invention provides a fuel monitor or system, which concurrently with vehicle operation keeps a visible running total of dollars and cents accumulation of fuel consumed, provides means for compensation for price changes and variations in vehicle efficiency in terms of miles per gallon or cu. ft. or pound of liquid, gaseous or solid fuel and warns when unnecessary expenditure of money is being made. The system also adapts to the use of electric power in monetary terms.

The above and other objects and advantages of this invention will become more readily understood on examination of the following description in which like reference numerals refer to like parts:

FIG. 1 is a front elevation view showing the cost display window, meter speed selection dial, locking barrel and partial section showing input cable connection and locking arm in place at meter reset access hole cover;

FIG. 2 is a left side sectional view taken through section A—A of FIG. 1 showing the input and outlet cable drive tangs, locking barrel shaft, the drive frame and the meter reset access cover in locked position;

FIG. 3 is a right side full view showing the two power discs, the belt drive for the meter, the servo-actuator of the overload signal and the end view of the articulated indexer;

Figure 4:
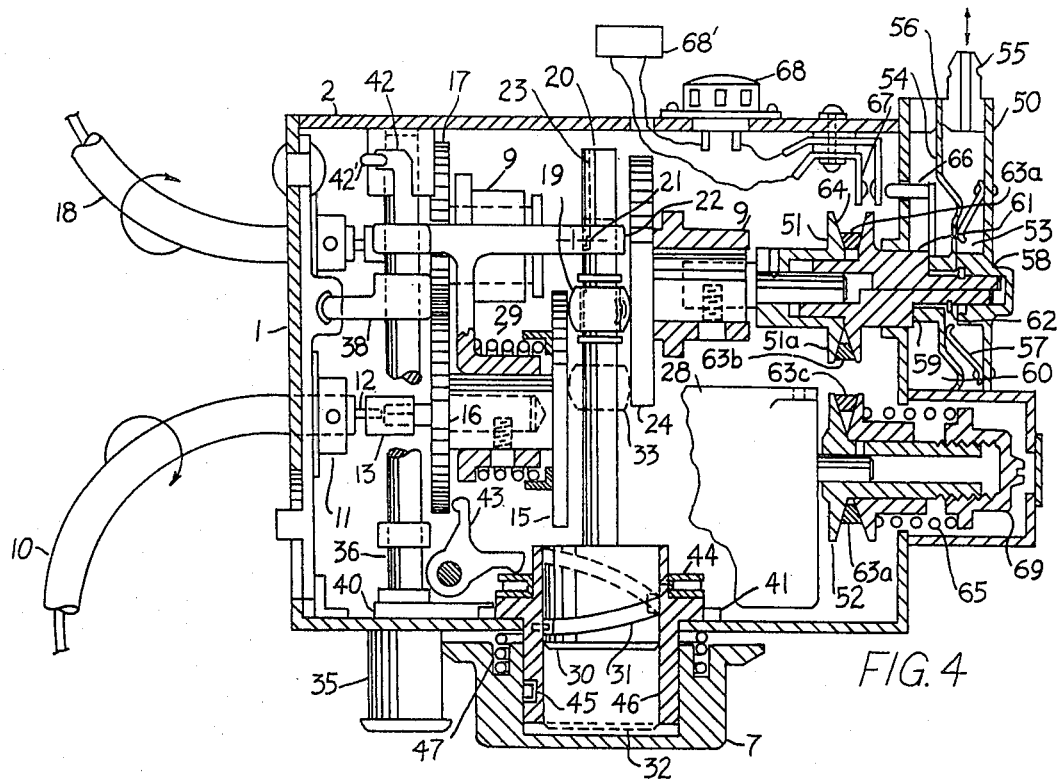
Figure 7:
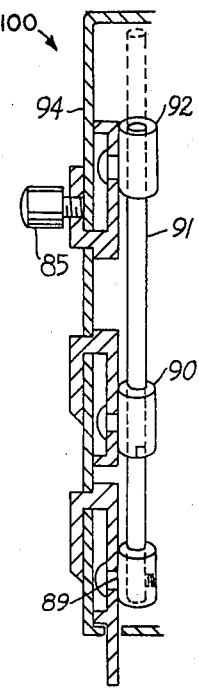
Figure 6:
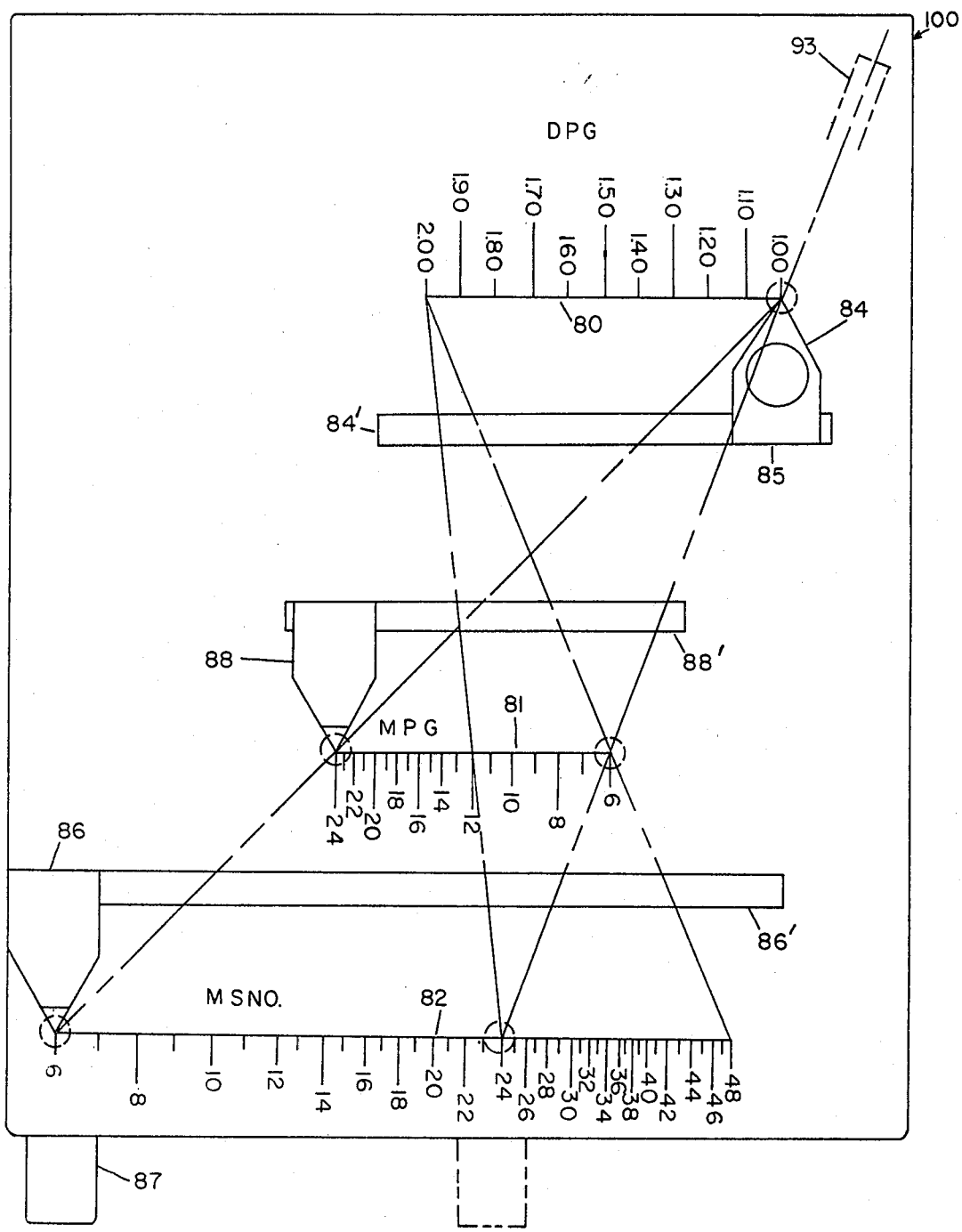

FIG. 4 is a plan sectional detail taken along lines showing most of section B—B from FIG. 1 indicating the input and outlet cable drives, the variable speed drive assembly and the belt drive to the meter, the servo-actuator of the overload signal, and alert warning circuitry; in this Figure the half-pulleys on the right are diagrammed in a split convention indicating the two extremes of position of each;

FIG. 5 shows cost-index curves, which simplify the selection of meter speed selection number based on the two variable factors of fuel cost, namely, the price of fuel and the vehicle performance in miles per gallon;

FIG. 6 is a plan view projected from FIG. 3, showing the articulated indexer;

FIG. 7 shows an end view, partly in section, of the indexer projected from FIG. 1.

DESCRIPTION OF BASIC COMPONENTS, SIMPLEST MODE FIGS. 1 THROUGH 5

FIG. 4 shows an input cable 10 from transmission (or other source of relative vehicle speed) fastened at collar 11 through the wall of containing case 1. The cable wire 12 is fastened to an adapter 13 which fits loosely on the axially movable drive tang 14 (FIG. 2) of driver power disc or first disc 15 with an integral gear 16 (FIG. 2) that drives mating gear 17 and in turn connects to the outlet cable 18 in a manner similar to the input cable 10. The outlet cable is connected to the regular odometer. The driven power disc 15 is in direct contact with idler 19 which is supported by idler shaft or spindle 20 which does not rotate and can move only in a linear direction through the influence of fixed pin 21 in shaft support bearing 22 and the slot 23 in the idler shaft 20.

The idler 19 is in direct contact with the driven power disc or second disc 24 which contains first pulley 51. The belt 63 is engaged with first pulley 51 and second pulley 52 which connects with cost indicating meter 28 supported with screws 28b (FIG. 1) and window 29A (FIG. 1).

The power flow starts with the rotation of input cable or odometer wire 12 through power disc 15, through idler 19, through power disc 24, through variable transmission means including first pulley 51, belt 63, pulley 52 and to meter 28, the cost displaying means, reading in dollars and cents. All drive elements up to pulley 51 are supported by main frame 9 (FIGS. 2 and 4). The driver power disc 15 is pre-loaded in axial travel in the mount by spring 29 so that idler 19 can receive its rotational influence from disc 15 and deliver it to disc 24 with no significant slippage. This frictional driving principle is common in a number of commercial drives such as the Metron Instrument Co. variable speed drive with push-pull speed control used on aircraft instruments.

To change the speed ratio setting between the input cable and the meter drive, the idler 19 is repositioned along the idler shaft 20 axis by a push-pull action imparted to the shaft by the turning of speed selector dial 7 which carries helix pin 30 around in a plane perpendicular to the idler shaft 20. Helix or helical track means 31 influences the idler shaft 20 to move in a back and forth direction thereby positioning the idler 19 in different locations between the power discs 15 and 24. This repositioning of the idler gives the drive variable speed characteristics. The selector dial 7 is thus means rotatable with the helical track means, for indicating the distance of axial thrusting of the idler shaft or spindle.

The idler position as shown in FIG. 4 is engaged at the maximum running pitch circle of power disc 15 and the minimum running pitch circle of power disc 24 producing the highest speed of the meter 28. When the speed dial 7 is turned clockwise the helix pin 30 causes the idler shaft 20 to move toward the dial 7 putting the idler 19 in position 33 producing the lowest speed of the meter 28 with idler shaft 20 in position 32.

RESETTING AND LOCKING DEVICES

The cost indicating meter 28 must be reset to zero from time to time and the speed dial must also be changed occasionally. Normally these functions are inoperable because of the locking feature. To turn meter manually reset knob 34 and turn dial 7 the selective access locking means, which may be any combination or key lock or the like, 35 must be opened by inserting key, for example, and turning lock shaft 36 clockwise which unlocks the reset access hole cover 37 by disengagement of second arm or lock arm 38 which allows cover 37 to drop to dotted line position at 8, FIG. 2. Reset knob 34 is now accessible through hole 39. The speed dial is unlocked by the disengagement of lock arm or first arm 40 from notched disc 41 attached to speed control dial 7. The housing removable back plate or cover 2 is unlocked by the opening of bayonet lock at 42 by disengagement of third arm 42' from the slot of the lock. After adjustments are made, turning the key counterclockwise at lock 35 will re-engage lock arm at the 3 points and unit is ready for operation.

To relieve the force of spring 29 on idler 19 so that speed changes can be made with less pressure-caused drag of the idler 19 against the 2 power discs, bell-crank 43 positioned between the input disc flange 15 and the thrust bearing 44. Before turning the dial 7, exerting inward pressure on the dial will move thrust bearing 44 against the bell-crank 43 which in turn will act on the flange 15 longitudinally and compress the spring 29 and increase the space between power discs 15 and 24. This provides clearance for the idler 19 to move freely back and forth. When hand pressure is released on dial 7 spring 29 will bring the driving elements back into contact. Also the spring 47 will bring the speed dial 7, lock pin 45 and shaft mounting 46 axially back to starting position.

A special mechanism may be provided as shown for built-in splicing of odometer cable from the monitor to the odometer through gear 17 and extra drive tang 14a. This arrangement eliminates the need for any other external power take-off mechanism.

OPERATION PROCEDURE SIMPLEST MODE

FIG. 5 shows the cost-index curves (prepared for liquid fuel only). From the horizontal bottom row of numbers "a", the user selects the number indicating the vehicle performance in miles per gallon of fuel (determined by test). From this point, he or she extends a vertical ordinate line to the applicable curve "b", "c", "d", etc. of fuel price. From this intersection point he or she extends a line to the left and finds the number along "e" for meter speed selection.

Assuming that the miles per gallon is 12 and the price per gallon is $2.00 then the meter speed selection number is found to be 24. The user then unlocks the unit and sets the speed selection dial 7 to 24, reaches through the access hole 39 and resets the meter to 0 with knob 34, locks the unit and the monitor is ready for operation. At this setting the meter 28 will show an accumulation of $0.166 for every mile traveled. At the end of 100 miles the meter will read $16.60. If the budget limit for the period is say $12.00 then it is apparent that an excess of $4.60 was spent. Should the cost of gasoline decrease to $1.75, the cost index curves FIG. 5 will show the new meter speed selection number to be 21. With vehicle at rest, the user unlocks the monitor, sets the speed dial 7 to #21, locks the unit, the monitor is ready to continue.

From now on until the next change the meter will show an accumulation of $0.146 for evey mile traveled, $1.75÷12=$0.146.

PREFERRED MODE SYSTEM ADDITIONS, FIGS. 4, 6 AND 7

As an added feature for the basic embodiment a load responsive servo-actuator 50 is attached to the special meter drive pulleys 51 and 52 for the purpose of biasing the cost indicating meter to show increases in rate of cost accumulation resulting from higher fuel consumption when higher than normal loads are imposed on the engine even at the same vehicle speed. This servo-actuator is means for modifying the display-to-vehicle speed in terms of instantaneous engine efficiency. When driving under normal conditions on roads, with low average grade variations such as anticipated with EPA ratings for miles per gallon, the basic embodiment without the servo actuator, will perform satisfactorily. However, under higher load conditions encountered when driving up steep hills, racing the engine and fast accelerations, the fuel consumption rate increases abnormally.

Under such conditions and with the use of the servo actuator feature the monitor can in addition to speeding up the meter proportionally for miles traveled normally also produce an "alert" warning that money is being consumed at higher than normal rates, in many cases unnecessarily. The half pulley 61 and its counterpart on pulley 52 are in half-view to show the extreme positions as the drive is influenced from minimum to maximum pulley ratios. Unlike other designs that have continuous "beeping" sound with variations in frequency of "beeps" in relation to fuel consumed, this system provides warning signals only when excessive fuel consumption occurs. This makes the signal more conspicuous by avoiding the monotonous drone of a continuous signal. The signals include display.

DESCRIPTION OF DESIGN PRINCIPLE
PREFERRED SYSTEM

The servo-actuator of the overload signal to be discussed, may receive its input signals from anyone of several sources of the engine when load variations occur. For the purpose of this example, pressure variations from certain parts of the engine are used as input signals for the servo operation. One of the places that emit such signals is in the intake manifold of the fuel-air mixture passageway. Here lies a good source of indication of the degree of fuel economy. For example, at normal idle the vacuum produced here is at the highest. At normal driving the vacuum is at medium ranges and at abnormal driving conditions the vacuum is in the low range.

FIG. 4 shows that servo chamber 53 contains a flexible diaphragm 54 which responds to vacuum conditions from inlet 55 and is firmly and tightly sealed around the periphery as at 56. On the right hand side and in the vacuum chamber, the diaphragm is loaded by a spring 57. At medium and high vacuums in the chamber 53, the diaphragm will be sucked back, overcome the spring 57 and butt against the "stop" at 58. On the left face of the diaphragm shoulder 59 in the vented chamber 60, a corresponding shoulder on half pulley 61 is part of variable pitch pulley 51. The snap-ring 62 forms the other shoulder by which the diaphragm controls the axial position of pulley shaft 61. When vacuum reduces to a point when spring 57 overcomes the pressure on the diaphragm, it will move to the left and force movable half-pulley 61 to bear hard against V-belt 63 and force it against fixed half-pulley 51a. This causes belt to slide up the inclined faces 64 of the pulleys which repositions the belt from 63a to position 63b, or from a smaller P.D. to a larger one. In turn the belt at pulley 52 will be forced from position 63c to position 63d or from a large pitch diameter to a smaller one and at the same time compressing spring 65 to a point of equilibrium with force of diaphragm spring 57. In effect the drive is now in a position of higher speed of meter in relation to input speed at input cable. In this position the plunger 66 attached to diaphragm is forced against two electrical contact points 67. This responsively closes an electrical circuit to the alert signal 68' through loudness control 68 indicating a condition of higher than normal fuel consumption. Any conventional alarm capable of giving a sensible warning, visible, audible or the like, can be activated. When the load condition on the engine reduces and the vacuum increases to a certain proportional point, the diaphragm is again sucked back against shoulder 58. This action will put the pulleys 51 and 52 in their original position. This feature is therefore means of warning of needless expenditure of money under conditions of uneconomical operation of the vehicle engine. The extent to which the pulley ratio changes can be controlled by varying the force at spring 65 by adjusting nut 69. This screw is therefore a means for further setting said ratio of display means drive to vehicle speed, this time in terms of average engine efficiency.

The use of split pulleys for varying pitch diameters is conventional and has been in commercial use for many years by such companies as Gerbing Mfg. Co., Lewellyn Mfg. Co. and Sterling Electric Motor Co.

PRINCIPLES OF INDEX DESIGN
PREFERRED MODE SYSTEM

As previously indicated, the cost index curves FIG. 5 shows the graphic relationship of cost per gallon (DPG), Miles per gallon (MPG) and Meter speed selection number (MS No.) derived from the formula—$(DPG/MPG) \times constant = MS$. No.

This formula is derived from original one $DPG/MPG = DOLLARS/MILE$: $DOLLARS/MILE \times CONSTANT = MS$ NO.

Therefore $(DPG/MPG) \times CONSTANT = MS$. NO.

This relationship is instrumented by the conception of a mechanical device which serves as an indexer shown at FIG. 6 and FIG. 7 as assembly 100.

The indexer is used to provide instant readings used to compensate the cost display meter speeds up or down as a result of any changes in gas prices and/or MPG performance of the vehicle. Here, relative meter speeds are meant.

FIG. 6 shows the indexer assembly with three graduated scales each arranged with pointers that are interconnected and adjustable. The left scale 80 shows the fuel price in dollars per gallon (DPG), the middle scale 81 shows miles per gallon (MPG) and the right-side scale 82 shows the meter speed selection No. (MS. No.). By setting the point 84 at the current gas price and locking the position of the pointer with screw 85 the MS. No. can be quickly found at pointer 86 by moving lever 87 to applicable MPG reading by pointer 88.

As the type of travel changes from city driving to normal highway driving the known differences in MPG can be used to provide the new MS. No. so that the cost indicating meter speed can be decreased proportionately. The same can be done when mode of travel changes significantly.

DESCRIPTION OF INDEXER COMPONENTS

Referring to FIGS. 6 and 7, the three pointers 84, 88, 86, which move in respective slots or first, second and third pointers respectively in first, second and third tracks, 84', 88' and 86', in a plate portion 94 on the case and are interconnected by a straight alignment rod 91 so that any position change of control lever 87 will always keep the tips of the three pointers aligned in a straight line. For example, referring to FIG. 6 the control lever 87 is at bottom position so that a fixed setting of $1.00 per gallon shows a meter speed (MS. No.) reading of 6 with the MPG pointer at 24. At the same fuel price the MS. No. is 24 at an MPG reading of 6. Any combination of settings along the parallel-spaced tracks within the limits of the graduated scales will produce readings equivalent to those shown on curves of cost index FIG. 5.

When gas price increases, pointer 84 is unlocked by screw 85 and moved to new price, locked and indexed ready for use same as before except that now the MS. No. will be higher for the same MPG. The alignment rod 91 is fixed to pointer 86 in a journal block that pivots at pin 89. The rod 91 extends through to a similar pivoting block at pointer 88 except that here the rod is free to slide back and forth. The rod continues on to pointer 84 in a block the same as at pointer 88. As the control lever is moved up in a straight line the alignment rod 91 slides through journal blocks 90 and 92 and finally extends outward to a point 93 to accommodate the triangulation effect of the different positions of pointer and rod.

VERIFYING THE COST INDICATING METER SIMPLEST MODE

To compensate for any suspected changes in performance of the vehicle or as a periodic check on the accuracy of the monitoring system, the following calibrating procedure is outlined in terms of instructions to the user: at some convenient time, start the test by filling the gas tank up to capacity and record the odometer reading. Set meter to zero and set speed dial to an MS No. obtained at the indexer referenced from an MPG value that is thought to be applicable to type of driving to be done. Proceed with driving.

At next filling (up to capacity) record price per gallon, cost of fill-up, total number of gallons and odometer reading. Say, total cost of filling is $24.00 and the meter reading is $15.00, giving a difference of $9.00. Any difference over 5%, justifies readjustment of speed dial. Get miles traveled from the two odometer readings, and divide by the number of gallons purchased. This gives the MPG value for this type of driving.

Refer to indexer and obtain the new MS. No. by lining up price pointer (current rate) with the newly found MPG. Assume to be for city-driving. Set speed dial to new MS. No. Record this MS. No. for city-driving. The $9.00 difference in gas purchase may be added manually to meter or it can be reset to zero, as preferred.

Note: This test is a case of having chosen an incorrect value of MPG. However, the test provides data that enables the operator to find the true MPG. To fine the MPG for highway-driving repeat the test under the new driving condition and record the MPG value for future reference.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by United States Letters Patent is:

1. A system for announcing to the driver the fuel cost of operating the engine of a motor vehicle having odometer input means comprising in combination: means (28) on a said motor vehicle for displaying said cost continuously during said operation, including
   (a) means including said odometer input means (10) for driving said displaying means in ratio to vehicle speed,
   (b) means including a speed selector dial (7) for setting said ratio in proportion to fuel cost,
   (c) screw means (69) for further setting said ratio in proportion to average vehicle engine efficiency, and
   (d) means including a serve-actuator (50) for modifying said ratio in proportion to instantaneous engine efficiency during said operation.

2. A system as recited in claim 1, and means including a signal circuit (67, 68) for warning of needless expenditure of money under conditions of uneconomical operation of said motor vehicle engine.

3. A system as recited in claim 2, wherein means (34) for manually resetting said displaying means (28) is provided, and wherein the system further comprises selective access means (35) for locking said displaying means (28) against unauthorized resetting.

4. A system as recited in claim 3, wherein said selective access means for locking locks said means (34) for manually resetting simultaneously with said locking of the displaying means (28).

5. A system as recited in claim 4, wherein said selective access locking means (35) connects with a shaft (36) responsive in rotation to locking by said selective-access locking means, and wherein the means for locking said means for manually resetting includes a first arm (40) on said shaft positionable by said rotation to engage notch structure (41) in said means for manually resetting.

6. A system as recited in claim 5, wherein said means for locking said displaying means includes a second arm (38) on said shaft positionable by said rotation to cover and uncover a hole (39) giving access for said resetting.

7. A system as recited in claim 6, wherein said system has a containing case (1), a removable back plate (2) on said containing case with a bayonet slot (42) in a portion thereof, and wherein said means for locking said displaying means includes a third arm (42') for engaging and disengaging said bayonet slot.

8. A system as recited in claim 1, wherein said means for driving the displaying means in ratio to vehicle speed further includes: a first disc, said odometer input means having connection for turning said first disc about a first axis, a second disc parallel-spaced from the first disc and rotatable about a second axis offset from the first axis, an idler, a spindle mounting the idler rotatably relative to the spindle with the idler under pressure between a face of the first disc and a face of the second disc; wherein said means for setting said ratio in proportion to fuel cost further includes: helical track means associated with the spindle for axially thrusting the spindle and the idler thereon across said face of the first disc and said face of the second disc in proportion to rotation of the helical track means, said speed selector dial rotatable with the helical track means for indicating the distance of said axial thrusting, and means connecting the displaying means for response to rotation of the second disc.

9. A system as recited in claim 8, and means for locking said means for setting, comprising notch structure (41) associated in rotation with said speed selector dial (7) and a member (40) engageable to prevent rotation of the notch structure.

10. A system as recited in claim 8, including means for relieving said pressure on the idler, comprising a bell-crank (43), said speed selector dial (7) having resilient means (47) permitting an axial displacement of the speed selector dial for moving the bellcrank and said connection for turning the first disc including means (13, 14) permitting withdrawing the first disc axially from said idler in response to said bellcrank movement.

11. A system as recited in claim 10, and bias means (29) for restoring the axial position of the first disc following a said axial withdrawal of the first disc.

12. A system as recited in claim 11, wherein the bias means produces said restoration by urging the first disc toward the idler and the second disc.

13. A system as recited in claim 8, the displaying means being a rotatably actuatable dollars-and-cents display, the means for modifying said ratio in proportion to instantaneous engine efficiency comprising: said servo-actuator (50) including engine intake vacuum-sensing-means (54) having output motion in proportion to said vacuum, and further comprising said means connecting the displaying means, and variable transmission means (51, 52, 63) responsive to said output motion for changing relative rotation in said connection between said second disc (24) and said rotatably actuatable dollars-and-cents display (28).

14. A system as recited in claim 13, the variable transmission means (51,52,63) being of the type having first and second pulleys (51,52) adjustable to have respectively variable effective diameters relative to a belt connecting the first and second pulleys, means causing said output motion to vary the effective diameter of the first pulley (51), and the screw means (69) for further setting said ratio in proportion to fuel efficiency comprising a biasing adjustment using said screw means (69) for resiliently urging the second said pulley (52) to maintain a maximum effective diameter.

15. A system as recited in claim 14, said biasing adjustment including said screw means (69) being screwable axially relative to the second pulley (52), and a spring (65) between the nut and the second pulley.

16. A system as recited in claim 13, and means for warning of needless expenditure of money caused by uneconomical operation of said engine of a motor vehicle, comprising: a warning signal (68') and means (67) responsive to one position of said output motion of the intake-vacuum-sensing means for actuating said warning signal.

17. A system as recited in claim 16, wherein the warning signal is electrically actuatable, and wherein said means responsive (67) comprises an electric switch having connection for actuating the warning signal means actuatable.

18. A system as recited in claim 1, said system having a containing case (1), and means on said containing case for determining the value in terms of meter speed selection number to be set in by the means including a speed selector dial (7) for setting said ratio in proportion to fuel cost, comprising a plate portion (94) of the containing case, a first track (84') on said plate calibrated in dollars-per-gallon, first pointer means (84) movable along the first track, a second track (88') parallel-spaced adjacent the first track on said plate and calibrated in miles per gallon, second pointer means (88) movable along the second track, a third track (86') on said plate parallel-spaced adjacent the second track (88') on said plate and calibrated in meter speed selection numbers, third pointer means (86) movable along the third track, an alignment rod (91) pivotally connecting all said pointers, and means for locking (85) the first pointer in selected position along said first track.

19. A system as recited in claim 10, said system having a containing case (1); said odometer input means (10) including: a first odometer cable (12), means (11) rotatably mounting an end of the first odometer cable at the containing case, a first gear (16), a coupling (13) at said end of the first odometer cable for rotating the first gear, a second gear (17) rotatably associated with the first gear, a second odometer cable (18), means rotatably mounting an end of the second odometer cable at the containing case, and means (14A) for rotating said end of the second odometer cable in response to rotation of the second gear.

20. A system as recited in claim 19, wherein the means for withdrawing the first disc axially from the idler comprises pressure of the bellcrank (43) on said first gear (16).

* * * * *